(12) United States Patent
McClure

(10) Patent No.: US 7,084,688 B2
(45) Date of Patent: Aug. 1, 2006

(54) CLOCK DISTRIBUTION PROVIDING OPTIMAL DELAY

(75) Inventor: David McClure, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 27 days.

(21) Appl. No.: 10/929,630

(22) Filed: Aug. 30, 2004

(65) Prior Publication Data
US 2006/0044039 A1    Mar. 2, 2006

(51) Int. Cl.
*G06F 1/04*    (2006.01)
(52) U.S. Cl. ...................... 327/293; 327/295
(58) Field of Classification Search .............. 327/292, 327/293, 295, 565, 566; 333/12
See application file for complete search history.

(56) References Cited

U.S. PATENT DOCUMENTS

| | | | | |
|---|---|---|---|---|
| 5,991,229 A | * | 11/1999 | Kim et al. | 365/233 |
| 6,211,714 B1 | * | 4/2001 | Jeong | 327/293 |
| 6,288,589 B1 | * | 9/2001 | Potter et al. | 327/295 |

* cited by examiner

*Primary Examiner*—Linh My Nguyen
(74) *Attorney, Agent, or Firm*—Lisa K. Jorgenson

(57) ABSTRACT

The invention provides a clock delay arrangement accounting for the worst-case delay situation of data signals, which is independent of the layout and technology. It comprises a main clock line; two dummy clock lines, each arranged parallel to the main clock line, and the main clock line disposed between the two dummy clock lines; and a clock source coupled to the main clock line and the two dummy clock lines, adapted to drive said dummy clock lines in phase opposition with respect to the main clock line.

24 Claims, 3 Drawing Sheets

CLOCK DISTRIBUTION PROVIDING OPTIMAL DELAY

BACKGROUND OF THE INVENTION

1. Field of Invention

The present invention relates to the distribution of clock signals in circuits where the synchronization between data and clock signals cannot be guaranteed.

2. Relevant Background

In digital circuits of increasing complexity, it is a challenge to maintain synchronization between data and clock signals throughout the circuits, essentially because of increasing parasitic capacitive influences due to decreasing distances between tracks. In order to prevent data loss, clock trees need to be carefully designed in order to approach synchronization between data and clock signals in sections of a circuit. The clock signal of a "branch" assigned to a specific section of the circuit is generated from a reference clock by delay elements that are sized to match the worst-case data delay situation in that section.

FIG. 1 schematically illustrates a typical example where synchronization between a clock signal and data signals is needed. Data signals on a data bus composed of n parallel data lines S1, S2 . . . Sn arrive at the input of a latch 10. Latch 10 is clocked by a clock signal CK.

When clock CK is low, the content of latch 10 tracks the values of signals S1-Sn as they appear at the input of the latch. At the subsequent rising edge of clock CK, the data then present in the latch is held until the next falling edge of the clock.

It is essential that the data in the latch be stable when the clock's rising edge appears. If the data is not stable when the rising edge appears, the data subsequently held in the latch will take a random value. Therefore, care should be taken in the layout of the clock line so that the rising edge at the clock input of the latch always occurs between two consecutive edges at each data input of the latch.

At an origin of data signals S1-Sn and clock CK, the data is assumed to be synchronous with clock CK, i.e. the transitions of signals S1-Sn occur simultaneously with transitions of clock CK. The data lines and clock line will usually be designed to have substantially the same length, and thus have similar capacitive and delay characteristics.

However, as the number of data lines S1-Sn increases, and the distance between the data lines decreases, the influence of parasitic capacitances 12 between the lines becomes significant. The clock line will usually not run close enough to the data lines to be affected in the same manner. As a result the transitions of the data signals will inevitably be delayed with respect to the clock signal.

As shown in FIG. 2, a conventional solution to prevent data loss in latch 10 is to delay the clock signal by inserting a buffer 14 in the clock line. Buffer 14 will be sized to insert a delay corresponding to the worst-case delay in lines S1-Sn.

This solution is however very dependent on the particular layout of the various lines and the technology used, i.e. each such buffer needs to be individually sized for every section of lines between two latches and for each technology the circuit is implemented in.

FIG. 3A is a solution for delaying the clock line that is less layout and technology dependent. The clock line CK runs between two parallel lines 16 and 18 that are connected to a fixed voltage, such as ground GND. The distance between the clock line and each of the ground lines 16 and 18 is substantially equal to the distance between two data lines S1-Sn. This distance will often be the minimal distance between tracks allowed by the technology.

With this arrangement, the transitions of the clock signal CK will be delayed by the two parasitic capacitances 12' present between the clock line and each of the ground lines, in a similar way any of the middle data signals S1-Sn will be delayed by two parasitic capacitances 12.

However, as will be explained below with reference to FIG. 3B, this solution is not fully satisfactory and will require additional elements that make it layout and technology dependent.

What is needed, therefore, is a clock delay arrangement accounting for the worst-case delay situation of the data signals, which is independent of the layout and technology.

SUMMARY OF THE INVENTION

According to the invention, this need is satisfied by a circuit comprising a main clock line; two dummy clock lines, each arranged parallel to the main clock line, and the main clock line disposed between the two dummy clock lines; and a clock source coupled to the main clock line and the two dummy clock lines, adapted to drive said dummy clock lines in phase opposition with respect to the main clock line.

A storage element is usually coupled to the main clock line and adapted to store data in sequence with transitions on said main clock line.

Preferably, the main clock line and the dummy clock lines run parallel to each other over a distance substantially equal to the length of said data lines.

The distance between main and dummy clock lines is preferably substantially equal to a minimum distance between data lines.

According to an embodiment of the invention, the clock source comprises a transmission gate coupling each of the dummy clock lines to a reference clock signal, and an inverter coupling the main clock line to the reference clock signal.

BRIEF DESCRIPTION OF THE DRAWING

The invention is illustrated in the accompanying drawing, in which:

FIG. 1 is a schematic diagram of parallel data lines and a clock line coupled to a latch, where delays in the data lines need to be accounted for.

DETAILED DESCRIPTION OF THE PREFERRED EMBODIMENTS

Figure 1:
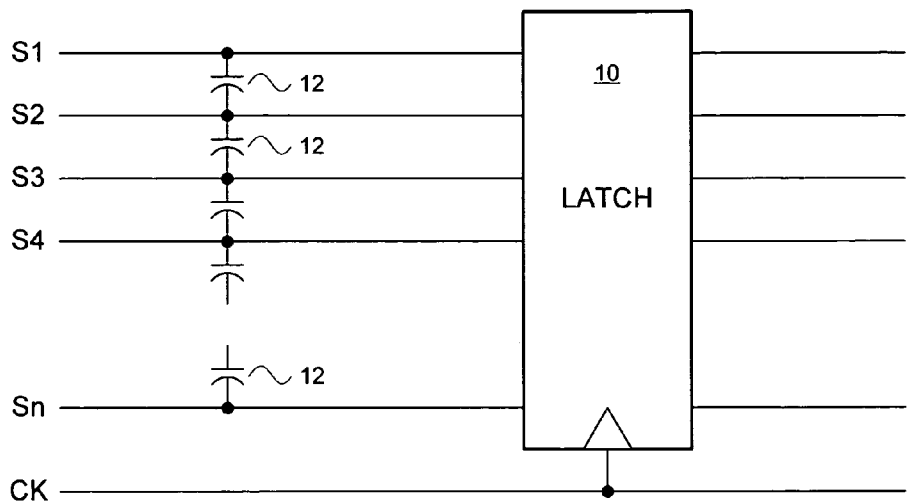
Figure 2:
FIG. 2 illustrates a common solution to insert a delay in a clock signal to account for the delays in the data lines.
Figure 3A:
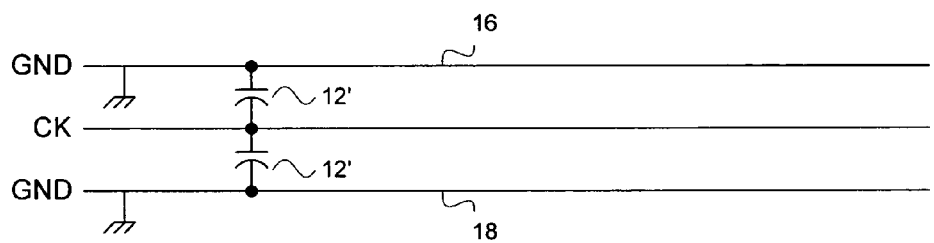
FIG. 3A illustrates an improved solution to create a delay in a clock signal.

As previously mentioned, the clock delay arrangement of FIG. 3A does not fully account for the worst-case delay situation in the data lines of FIG. 1.

Figure 3B:
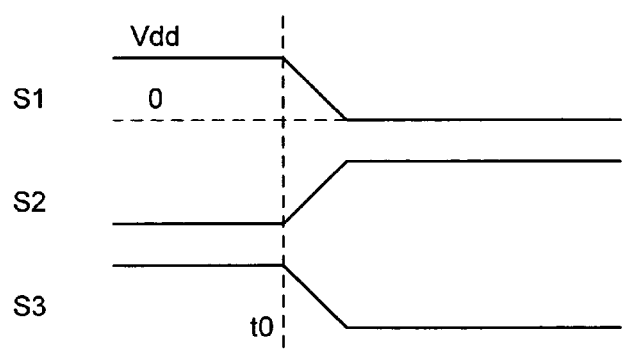
FIG. 3B is a timing diagram illustrating the worst-case delay situation for parallel data lines.

FIG. 3B illustrates why. The worst-case situation is when one of the middle data lines of FIG. 1, say S2, transitions in phase opposition to its immediate surrounding lines S1 and S3. Indeed, in this situation, each of the two parasitic capacitances 12 coupled to line S2 is first discharged and then charged in opposite direction. For instance, if Vdd is the voltage swing of signals S1–Sn, each of the two capacitances 12 sees a 2Vdd voltage swing. As a result, the transition of signal S2 is delayed twice as much as in the situation of clock CK in FIG. 3A, where the surrounding lines 16 and 18 are at a fixed voltage and the parasitic capacitances only see a Vdd voltage swing.

To compensate for this worst-case situation, delay elements will still need to be inserted in the clock line of FIG. 3A, whereby the clock delay solution of FIG. 3A remains technology and layout dependent.

Figure 4:
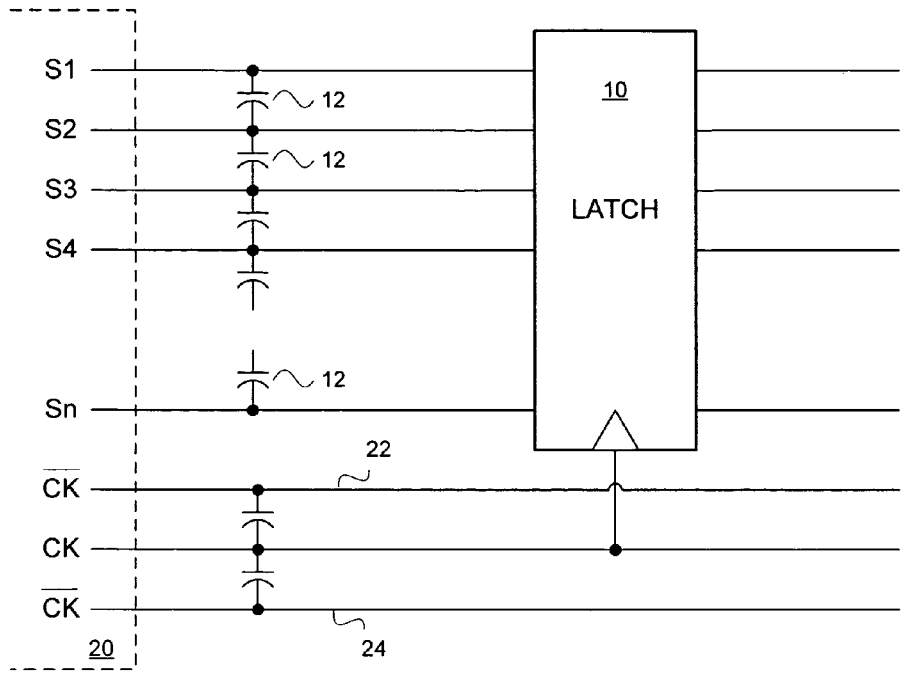
FIG. 4 is a schematic diagram of parallel data lines coupled to a latch, and an embodiment of the invention for delaying a clock signal.

FIG. 4 is a schematic diagram of a latch 10 receiving parallel data lines S1–Sn and clocked by a main clock signal CK. Similarly to FIG. 1, the data lines S1–Sn and clock line CK are approximately of same length between latch 10 and a synchronous source 20 of signals S1–Sn and CK.

According to an embodiment of the invention, two dummy clock lines 22 and 24 run parallel, on either side, of main clock line CK. Each of these dummy clock lines bears a clock signal that is opposite in phase to main clock signal CK.

With this arrangement, upon each transition of clock signal CK, each of the dummy clock lines transitions in opposite direction, reproducing the worst-case situation of FIG. 3B, where the parasitic capacitances between the lines see a voltage swing of 2Vdd.

The length of dummy clock lines 22, 24 along the clock line CK is preferably equal to, or greater than the length of the data lines S1–Sn between source 20 and latch 10. The distance between each of the dummy clock lines and the main clock line CK is preferably equal to, or smaller than the smallest distance between the data lines.

In this manner, whatever the lengths of the lines, the distance between them, and the technology used, clock signal CK will always track the worst-case situation of delay in the data lines S1–Sn.

Figures 5A, 5B:
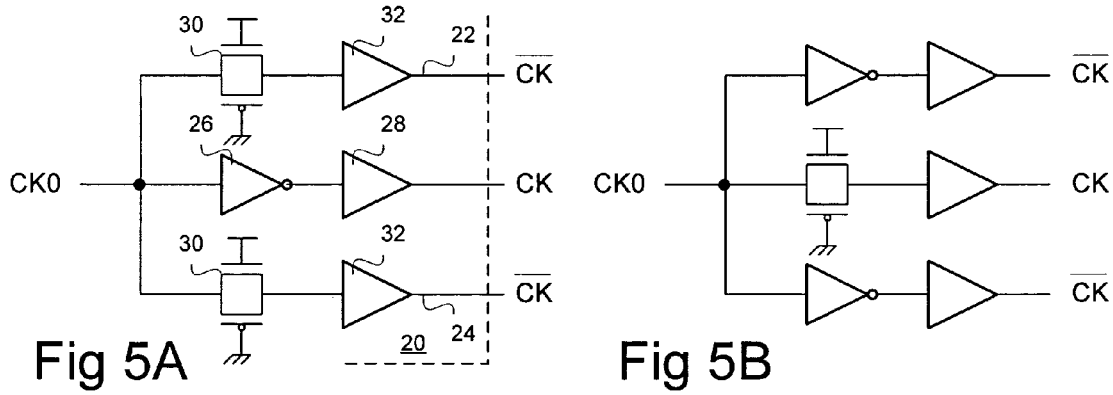
FIGS. 5A and 5B are schematic diagrams of circuitry for generating required clock signals in the arrangement of FIG. 4.

FIG. 5A is a schematic diagram of an exemplary source 20 providing the clock signals to main line CK and dummy lines 22, 24. The main clock signal CK is provided from a reference clock signal CK0 through an inverter 26 and a buffer 28. Each of the dummy clock signals is provided from the same reference clock CK0 through a transmission gate 30 and a buffer 32. The transmission gates 30 are permanently set to a pass state, and their role is to insert substantially the same delay as inverter 26.

Of course, the same results as the circuit of FIG. 5A are obtained by substituting the inverter by a transmission gate, and the transmission gates by inverters, as shown in FIG. 5B.

Figure 6:
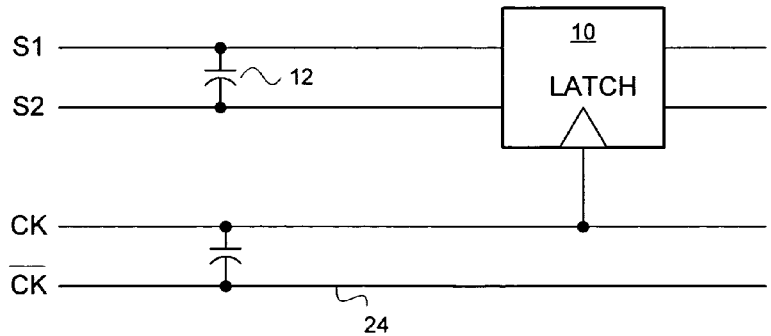
FIG. 6 is a schematic diagram of an embodiment of the invention applied to only two data lines.

FIG. 6 schematically illustrates an embodiment of the invention applied to the case of only two data lines S1, S2. The worst-case situation is when signals S1 and S2 transition in opposite directions, whereby the parasitic capacitance between the lines sees a voltage swing of 2Vdd.

This situation would be compensated by using the clock delay arrangement of FIG. 3A. Indeed, the delay introduced when swinging the voltage by Vdd across two capacitors, as in FIG. 3A, is equivalent to the delay introduced when swinging the voltage across one capacitor by 2Vdd. The solution would be technology and layout independent in this particular case. It however requires 3 lines for the clock.

According to the embodiment of the invention shown in FIG. 6, only two clock lines are required, one bearing the clock signal CK fed to the latch 10, the other 24 bearing the opposite phase clock signal.

Figure 7:
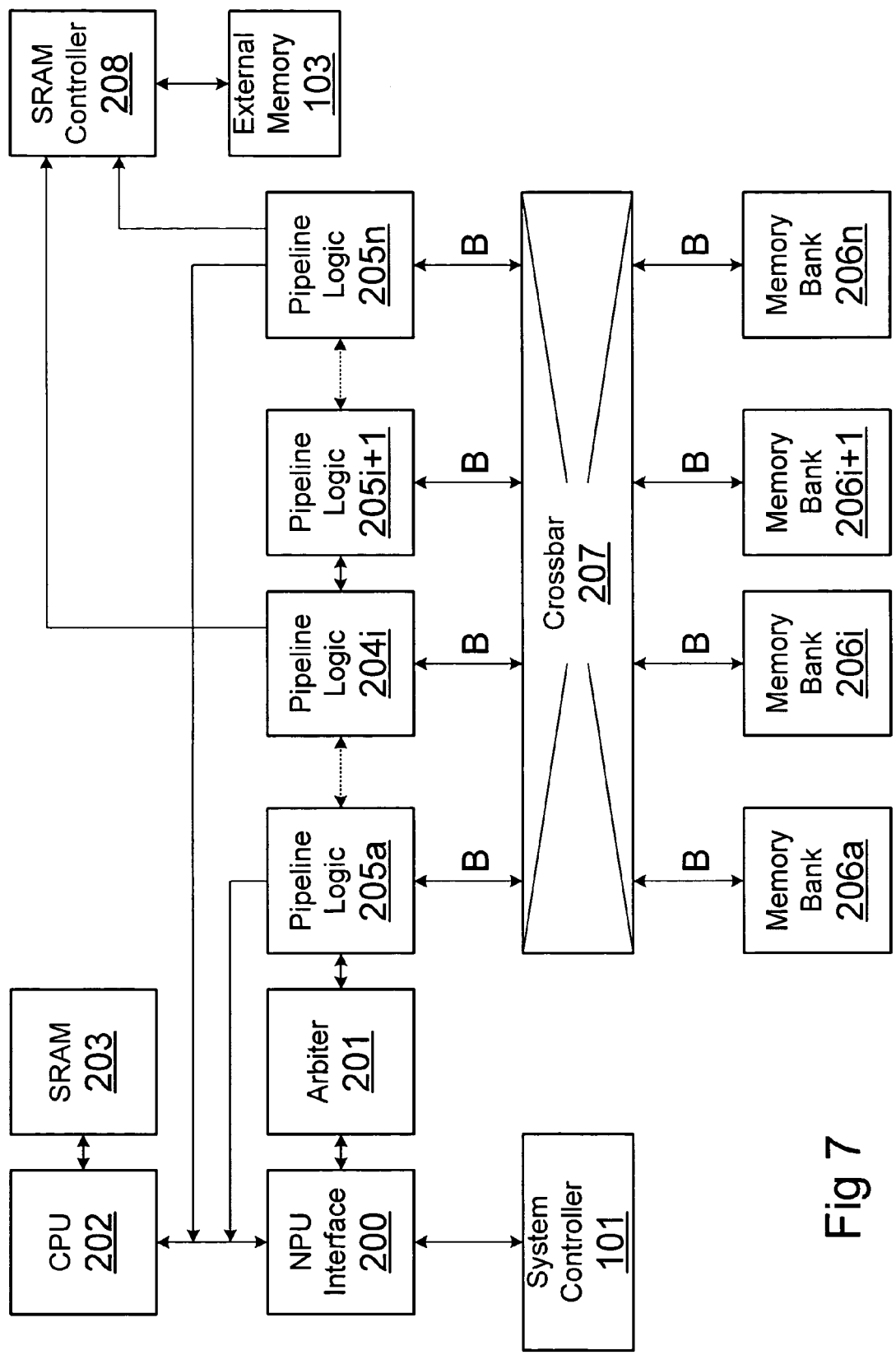
FIG. 7 is a schematic diagram of a pipeline network search engine in which the present invention may advantageously be used.

FIG. 7 depicts a system having a pipeline network search engine 102 in which the present invention may be used advantageously. This search engine is fully described in US Patent Publication 2004/0109451, incorporated herein by reference. It includes: a network processor unit interface 200 coupling the search engine to a system controller 101; an arbiter 201; a central processor unit (CPU) 202 with associated memory (SRAM) 203 containing the programs executed by CPU 202; an SRAM controller 204 coupling the search engine to external memory 103; and an array of pipeline logic units 205a–205n and a corresponding set of configurable memory blocks 206a–206n forming a series of virtual memory banks, with pipeline logic units 205a–205n and memory blocks 206a–206n coupled by a meshed crossbar 207 enabling the virtual bank configurations.

Crossbar 207 will typically, upon command, effect a point-to-point connection of any one of the pipeline logic units 205 to any one of the memory banks 206. The point-to-point connection will include as many data lines as the data width of the memory banks, address lines, and a clock line. The data, address and clock lines are depicted as bidirectional buses B between each of the pipeline units 205, memory banks 206 and the crossbar 207. These lines may cross several latches in the crossbar 207, depending on the number of stages in the crossbar. The delay problems caused by the lengths of the lines will arise between latches in the crossbar, and between the crossbar, the pipeline units, and the memory banks.

Advantageously, the present invention will be used for the clock lines in such a system, overcoming the need for the designer to take specific care in adjusting the delays of the clock lines.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For instance, although a latch is described as being driven by the main clock line, any element having a data storage function may be used instead of the latch.

Although an exemplary embodiment of a system has been shown in FIG. 7, it is understood that the present invention may be utilized in any number of systems for distributing clock and data signals within the system.

The invention claimed is:

1. A circuit comprising:
   a main clock line;
   two dummy clock lines, each arranged parallel to the main clock line, and the main clock line disposed between, and adjacent to the two dummy clock lines; and
   a clock source coupled to the main clock line and the two dummy clock lines, the clock source configured to drive said dummy clock lines in phase opposition with respect to the main clock line.

2. The circuit of claim 1, further comprising:
a storage element coupled to the main clock line and configured to store data in sequence with transitions on said main clock line.

3. The circuit of claim 2, including data lines coupled to the storage element, wherein the main clock line and the dummy clock lines run parallel to each other over a distance substantially equal to the length of said data lines.

4. The circuit of claim 3, comprising at least three parallel running data lines.

5. The circuit of claim 3, wherein the distance between main and dummy clock lines is substantially equal to a minimum distance between data lines.

6. The circuit of claim 1, including a reference clock, wherein the clock source comprises a transmission gate coupling each of the dummy clock lines to a reference clock signal, and an inverter coupling the main clock line to the reference clock signal.

7. The circuit of claim 1, including a reference clock, wherein the clock source comprises an inverter coupling each of the dummy clock lines to a reference clock signal, and a transmission gate coupling the main clock line to the reference clock signal.

8. The circuit of claim 1, wherein the main clock line, the dummy clock lines, and the clock source form part of an integrated circuit.

9. A circuit comprising:
a main clock line;
a dummy clock line arranged parallel and adjacent to said main clock line; and
a clock source coupled to the main clock line and the dummy clock line, the clock source configured to drive said dummy clock line in phase opposition with respect to the main clock line.

10. The circuit of claim 9, further comprising:
a storage element coupled to the main clock line and configured to store data in sequence with transitions on said main clock line.

11. The circuit of claim 10, including data lines coupled to the storage element, wherein the main clock line and the dummy clock line run parallel to each other over a distance substantially equal to the length of said data lines.

12. The circuit of claim 11, comprising two parallel running data lines.

13. The circuit of claim 11, wherein the distance between main and dummy clock lines is substantially equal to the distance between data lines.

14. The circuit of claim 9, wherein the clock source comprises an inverter and a transmission gate, each coupling a respective one of the main clock line or dummy clock line to a reference clock.

15. A crossbar arranged to effect a point-to-point connection between any one of a plurality of first elements and any one of a plurality of second elements, comprising, for each point-to-point connection:

a main clock line;
two dummy clock lines, each arranged parallel to the main clock line, and the main clock line disposed between, and adjacent to the two dummy clock lines; and
a clock source coupled to the main clock line and the two dummy clock lines, the clock source configured to drive said dummy clock lines in phase opposition with respect to the main clock line.

16. The crossbar as recited in claim 15, included in a network search engine, said first and second elements comprising pipeline logic units and memory banks.

17. A system comprising:
a plurality of first elements;
a plurality of second elements;
data lines selectively coupled between any one of said first elements and any one of said second elements;
a main clock line selectively coupled between any one of said first elements and any one of said second elements;
two dummy clock lines, each arranged parallel to the main clock line, and the main clock line disposed between, and adjacent to the two dummy clock lines; and
a clock source coupled to the main clock line and the two dummy clock lines, the
clock source configured to drive said dummy clock lines in phase opposition with respect to the main clock line.

18. The system of claim 17, further comprising:
a storage element coupled to the main clock line and data lines, configured to store data in sequence with transitions on said main clock line.

19. The system of claim 17, wherein the main clock line and the dummy clock lines run parallel to each other over a distance substantially equal to the length of said data lines.

20. The system of claim 17, comprising at least three parallel running data lines.

21. The system of claim 17, wherein the distance between main and dummy clock lines is substantially equal to a minimum distance between data lines.

22. The system of claim 17, including a reference clock, wherein the clock source comprises a transmission gate coupling each of the dummy clock lines to a reference clock signal, and an inverter coupling the main clock line to the reference clock signal.

23. The system of claim 17, including a reference clock, wherein the clock source comprises an inverter coupling each of the dummy clock lines to a reference clock signal, and a transmission gate coupling the main clock line to the reference clock signal.

24. The system of claim 17, included in a network search engine, wherein the first and second elements comprise pipeline logic units and memory banks.

* * * * *